(12) United States Patent
Fernandes et al.

(10) Patent No.: US 12,157,559 B2
(45) Date of Patent: Dec. 3, 2024

(54) ARRANGEMENT FOR LOCKING AN AIRCRAFT LANDING GEAR

(71) Applicant: SAFRAN LANDING SYSTEMS, Velizy Villacoublay (FR)

(72) Inventors: Philippe Domingos Fernandes, Moissy-Cramayel (FR); Marc Farcy, Moissy-Cramayel (FR); Nicolas Ludger, Moissy-Cramayel (FR)

(73) Assignee: SAFRAN LANDING SYSTEMS, Vélizy-Villacoublay (FR)

(*) Notice: Subject to any disclaimer, the term of this patent is extended or adjusted under 35 U.S.C. 154(b) by 52 days.

(21) Appl. No.: 17/996,252

(22) PCT Filed: Apr. 8, 2021

(86) PCT No.: PCT/FR2021/050617
§ 371 (c)(1),
(2) Date: Oct. 14, 2022

(87) PCT Pub. No.: WO2021/214396
PCT Pub. Date: Oct. 28, 2021

(65) Prior Publication Data
US 2023/0211874 A1   Jul. 6, 2023

(30) Foreign Application Priority Data

Apr. 20, 2020   (FR) ........................... 2003926

(51) Int. Cl.
*B64C 25/26*   (2006.01)
(52) U.S. Cl.
CPC .................... *B64C 25/26* (2013.01)
(58) Field of Classification Search
CPC .......... B64C 25/26; B64C 25/30; B64C 25/20
See application file for complete search history.

(56) References Cited

U.S. PATENT DOCUMENTS

| 3,514,057 A | 5/1970 | Biggs |
| 6,279,853 B1* | 8/2001 | Brighton ............... B64C 25/26 |
| | | 244/102 R |

(Continued)

FOREIGN PATENT DOCUMENTS

| FR | 2801865 A1 | 6/2001 |
| GB | 1333200 A | 10/1973 |
| WO | WO-2009150376 A2 * | 12/2009 ............ B64C 25/14 |

OTHER PUBLICATIONS

International Search Report for issued in Application No. PCT/FR2021/050617 dated Jul. 8, 2021.

(Continued)

*Primary Examiner* — Brady W Frazier
*Assistant Examiner* — Shanna Danielle Glover
(74) *Attorney, Agent, or Firm* — Pearne & Gordon LLP

(57) ABSTRACT

An aircraft landing gear includes: a strut assembly hinged by its upper end to a structure element of the aircraft to pivot between deployed and retracted states; an interlocking system having a stay including an arm hinged to the strut assembly via a lifting pin carried by two lugs of a clevis of the strut assembly, this arm being terminated by a head through which the pin passes and which is located between the lugs; and a lifting jack having one end connected to a first end of the pin which is located outside the clevis, a first end stop carried by the pin at its first end beyond the jack, and a second end stop carried by the pin at its second end. The landing gear includes a system for translationally locking the lifting pin in the event of the pin breaking between its first end and the clevis.

8 Claims, 4 Drawing Sheets

(56) References Cited

U.S. PATENT DOCUMENTS

2020/0094950 A1   3/2020  Bennett
2020/0231295 A1*  7/2020  Messina ............... F16C 11/045

OTHER PUBLICATIONS

Written Opinion for PCT/FR2021/050617 dated Jul. 8, 2021.
Search Report issued in French Patent Application No. 2003926 dated Dec. 10, 2020.

* cited by examiner

ARRANGEMENT FOR LOCKING AN AIRCRAFT LANDING GEAR

This is the National Stage of PCT international application PCT/FR2021/050617, filed on Apr. 8, 2021 entitled "ARRANGEMENT FOR LOCKING AN AIRCRAFT LANDING GEAR", which claims the priority of French Patent Application No. 2003926 filed Apr. 20, 2020, both of which are incorporated herein by reference in their entireties.

TECHNICAL FIELD

The invention relates to securing the operation of an aircraft landing gear in the event of one of the hinge pins for deployment of this landing gear breaking.

PRIOR ART

An aircraft landing gear includes a leg including a strut assembly in which a lower portion carrying a set of wheels slides in a cushioned manner. The strut assembly is hinged at its upper end to a structure element to enable the whole to pivot about a main axis for deployment and retraction. In addition, an interlocking system is provided to lock the whole in the deployed position.

This interlocking system includes a main stay including a panel and a connecting rod hinged to each other, the panel being hinged to the structure and the connecting rod being hinged to a lower part of the strut assembly, as well as a secondary stay to hold the panel and the connecting rod aligned in the interlocking configuration.

The secondary stay includes two arms hinged to each other, the first of which is further hinged to the hinge connecting the panel to the connecting rod, the second of which is further hinged to an upper part of the strut assembly.

The whole is moved from its retracted state to its deployed state by a jack having one end connected to a structure element and its other end connected to an upper part of the strut assembly via one end of a so-called lifting pin, the central part of which also carries the second arm of the secondary stay. This lifting pin is carried by a clevis which is rigidly attached to the strut assembly.

The deployment the landing gear consists in controlling the jack so that it deploys, which results in pivoting the strut assembly with the whole landing gear, due to the offset between the lifting pin and the main axis of rotation of the strut assembly.

The panel and the connecting rod of the main stay then deploy from a folded state until they extend as an extension of each other. Similarly, the arms of the secondary stay also deploy until they extend as an extension of each other so as to occupy their interlocking position.

In the event of the end of the lifting pin carrying the jack breaking, this lifting pin is likely to move and get out of the clevis carrying it, so that it no longer holds the arm of the secondary stay. The landing gear is then no longer interlocked in the deployed position, which makes it impossible to land.

One object of the invention is to provide a solution to remedy this drawback.

DISCLOSURE OF THE INVENTION

To this end, one object of the invention is an aircraft landing gear comprising a strut assembly hinged to a structure element of the aircraft to pivot between a deployed state and a retracted state, this landing gear comprising:

a jack to retract and deploy the landing gear, this jack having an operating head connected to a first end of a lifting pin carried by two lugs of a clevis of the strut assembly, this first end being located outside the clevis;

an interlocking system comprising a stay including an arm hinged to an upper part of the strut assembly via the lifting pin, this arm being terminated by a head located between the lugs of the clevis and through which the lifting pin passes;

a first end stop carried by the lifting pin at its first end, and a second end stop located at the second end of the lifting pin;

characterised in that it includes a system for translationally locking the lifting pin in the event of this lifting pin breaking between its first end and the clevis.

The invention thus makes it possible to ensure the interlocking of the deployed landing gear despite the lifting pin breaking at the end by which it is connected to the operating jack. In other words, the loss of the lifting function does not result in the loss of the interlocking of the landing gear in the event of the lifting pin breaking.

The invention also relates to a landing gear thus defined, in which the second stop includes a shoulder formed at the second end of the lifting pin, and in which the locking system includes a locking member located axially facing the shoulder and rigidly integral with the clevis.

The invention also relates to a landing gear thus defined, in which the locking member is rigidly attached to the clevis by being fixed to a ring carried by a lug and forming a bearing of the lifting pin, this ring being rigidly attached to the lug which carries it.

The invention also relates to a landing gear thus defined, in which the ring is rigidly attached to the lug bore by shrink fit.

The invention also relates to a landing gear thus defined, in which the locking member is a bar having a length greater than the diameter of the shoulder.

The invention also relates to a landing gear thus defined, in which the ring includes two tabs protruding radially beyond the shoulder, and two bolts each passing through one end of the bar and one radial tab.

The invention also relates to a landing gear thus defined, in which the locking system includes a radially extending screw passing jointly through the head of the arm and the lifting pin.

The invention also relates to a landing gear thus defined, in which the screw passes right through the head and the lifting pin and is held by a nut screwed onto its end.

DETAILED DISCLOSURE OF THE INVENTION

Figure 1:
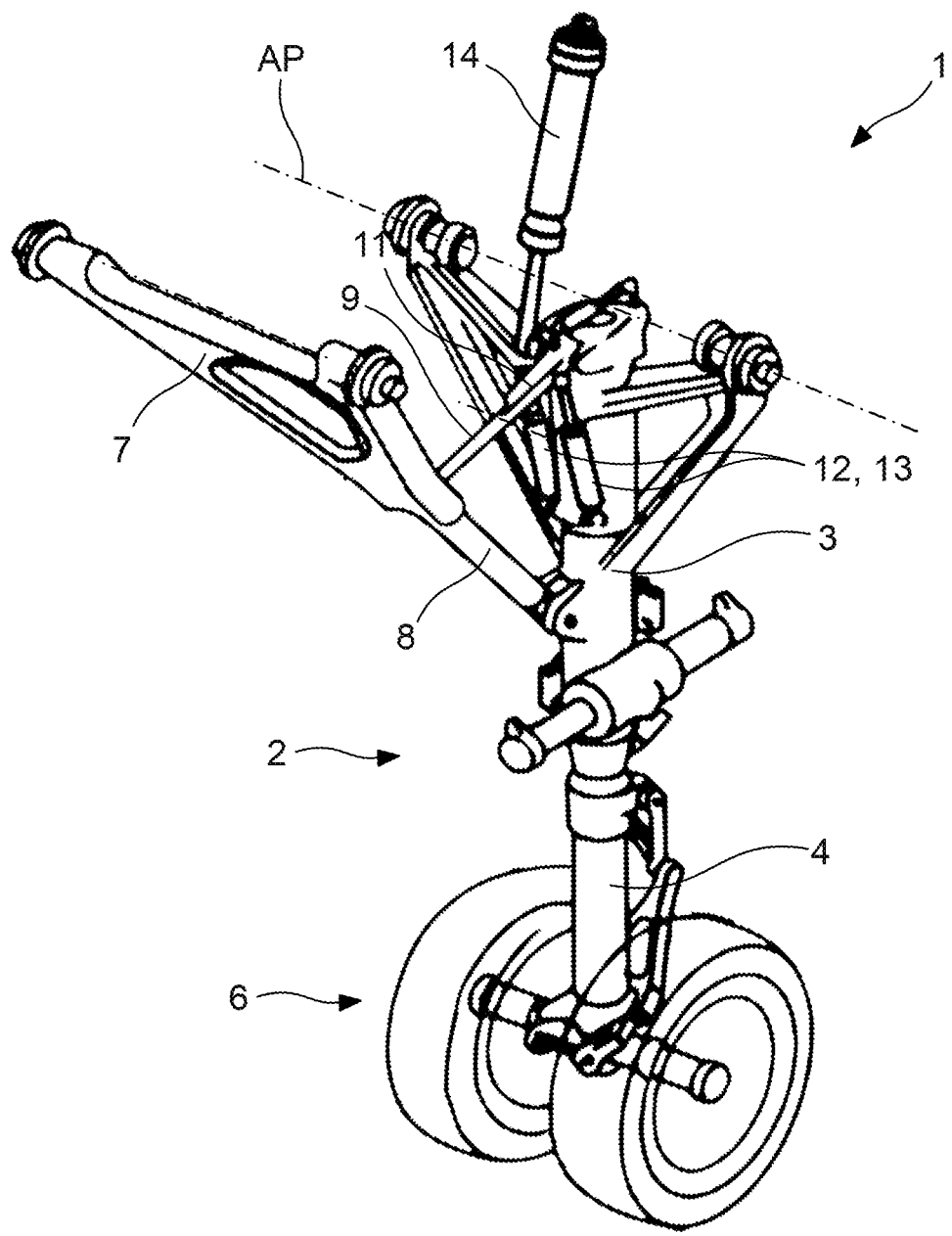
FIG. 1 is an overall perspective view showing a landing gear.

As represented in FIG. 1, a landing gear 1 typically includes a leg 2 comprising a strut assembly 3 in which a lower portion 4 carrying a set of wheels 6 slides in a cushioned manner.

The strut assembly 3 is hinged at its upper end to a structure element of the aircraft to enable the whole landing gear to pivot about a transversely extending main axis of rotation AP, to enable deployment and retraction. Additionally, an interlocking system is provided to lock the whole in the deployed position, as in FIG. 1.

This interlocking system includes a main stay including a panel 7 and a connecting rod 8 hinged to each other, the panel 7 being hinged to the structure of the aircraft and the connecting rod 8 being hinged to a lower part of the strut assembly, and a secondary stay to hold the panel 7 and the connecting rod 8 aligned with each other.

The secondary stay includes two arms 9 and 11 hinged to each other, arm 9 being hinged to the hinge connecting the panel 7 to the connecting rod 8, the arm 11 being hinged to an upper part of the strut assembly 3. A pair of springs 12 and 13 hold the arms 9 and 11 as an extension of each other to lock the whole in the deployed state as shown in FIG. 1.

The whole is moved from its retracted state to its deployed state by a jack 14 comprising a body 16 in which a shank 17 slides. The end of the body 16 is connected to a structure element of the aircraft, while the end of the shank 17 is connected to an upper part of the strut assembly 3.

The deployment of the landing gear 1 consists in controlling the jack 14 so that it deploys, which results in pivoting the strut assembly 3 around the axis AP, as well as the whole landing gear, due to the offset between the lifting pin 23 and the axis of rotation AP of the strut assembly which are parallel to each other.

During this deployment, the panel 7 and the connecting rod 8, starting from a folded state, deploy spontaneously until they extend as an extension of each other. Similarly, the arms 9 and 11 also deploy spontaneously until they extend as an extension of each other so as to occupy an interlocking position of the whole in which they are held by the springs 12, 13.

Figure 2:
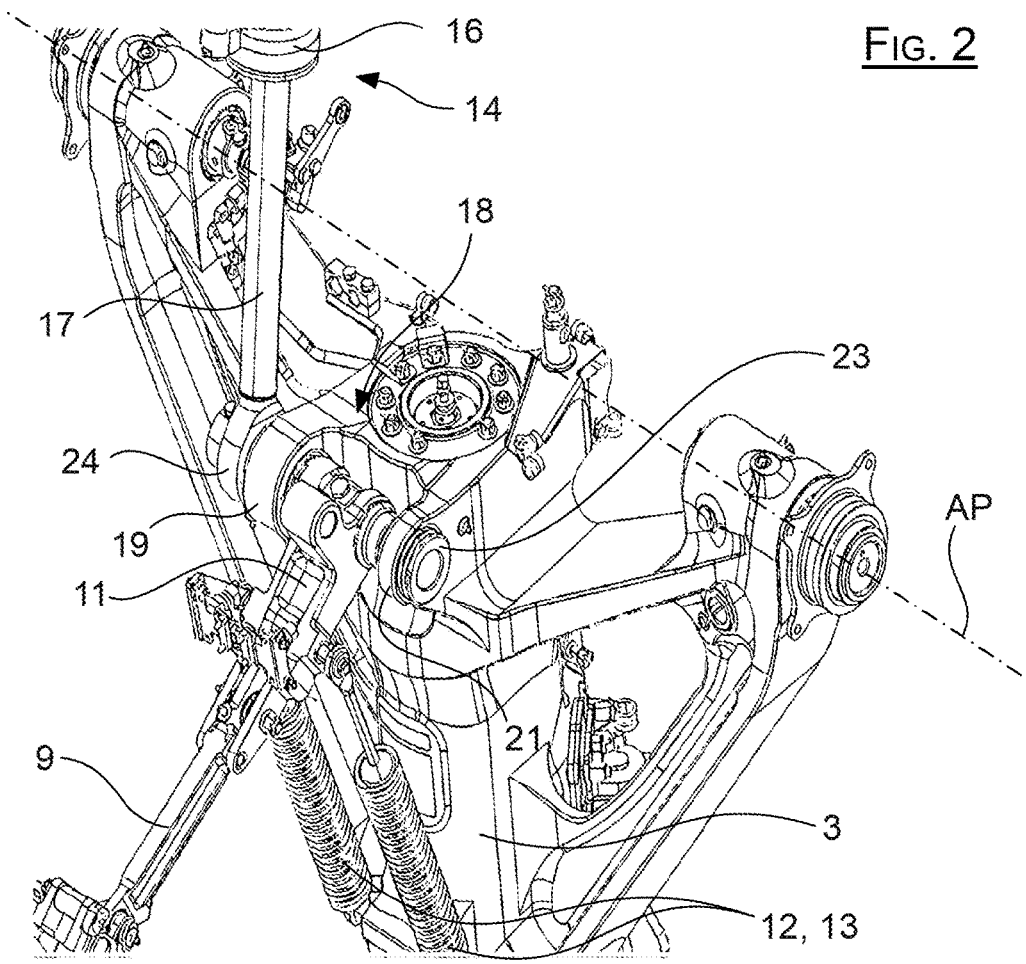
FIG. 2 is a perspective view of an upper portion of a landing gear.
Figure 3:
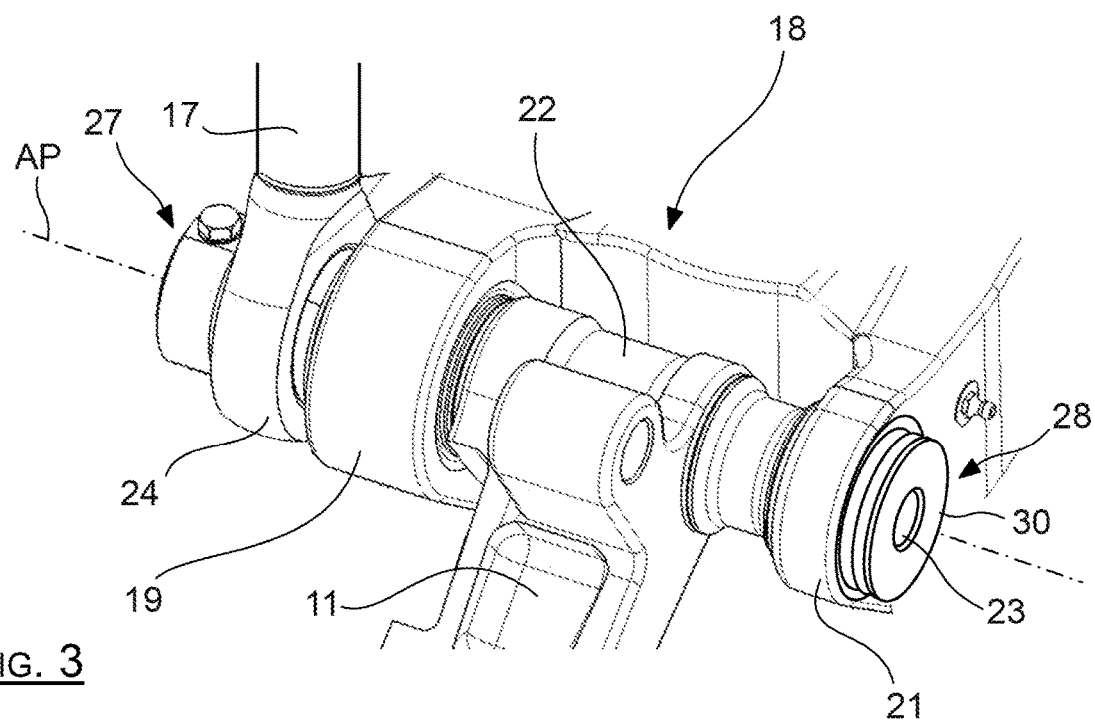
FIG. 3 is a perspective view of a connection by a lifting pin of a landing gear strut assembly with its operating jack and with a stay arm.

As more clearly visible in FIGS. 2 and 3, the upper portion of the strut assembly 3 includes a clevis 18 comprising a first and a second lug 19 and 21 carrying a lifting pin 23 which is transversely oriented, that is, parallel to the main axis AP, but offset from this axis.

The lifting pin 23, which is held by the lugs 21 and 19, carries in its central region, that is, between these lugs, the head 22 of the arm 11 through which it passes, and this lifting pin 23 protrudes beyond the first lug, to receive an operating head 24 extending from the shank 17 of the jack 14 and by which the shank 17 is connected to this pin by a swivel.

This lifting pin 23 is translationally locked by a first end stop 27 and by a second end stop 28. The first stop 27 clamps the first end of the lifting pin 23, namely, that which is closest to the first lug 19, so as to form an obstacle with a diameter greater than the nominal diameter of the pin. The second stop 28 is formed by a shoulder 30 terminating the second end of the lifting pin 23, namely, that which is closest to the second lug 21, this shoulder 30 having a diameter greater than the nominal diameter of the pin so as to form an obstacle to the axial movement of the lifting pin 23. The operating head 24 of the jack 14, which surrounds this lifting pin 23, is located between the first lug 19 and the first stop 27.

Figure 5:
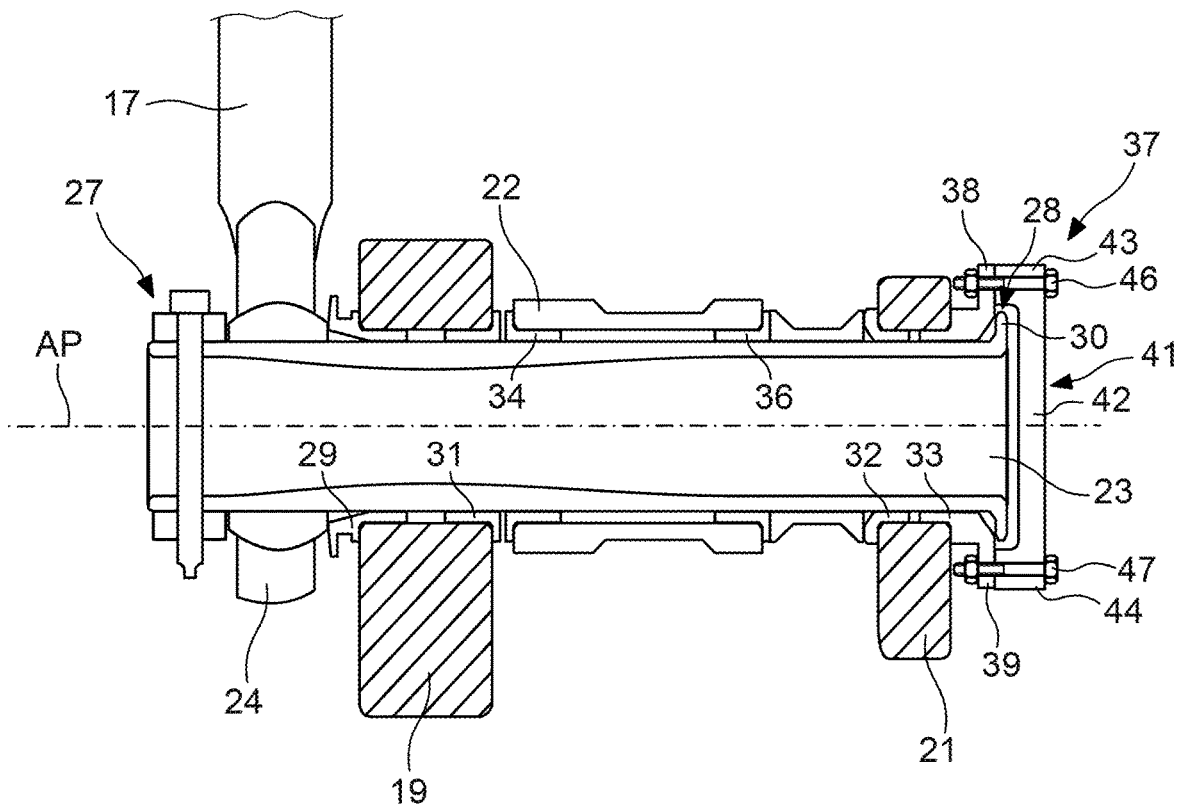
FIG. 5 is a cross-sectional view of the invention applied to a landing gear.
Figure 7:
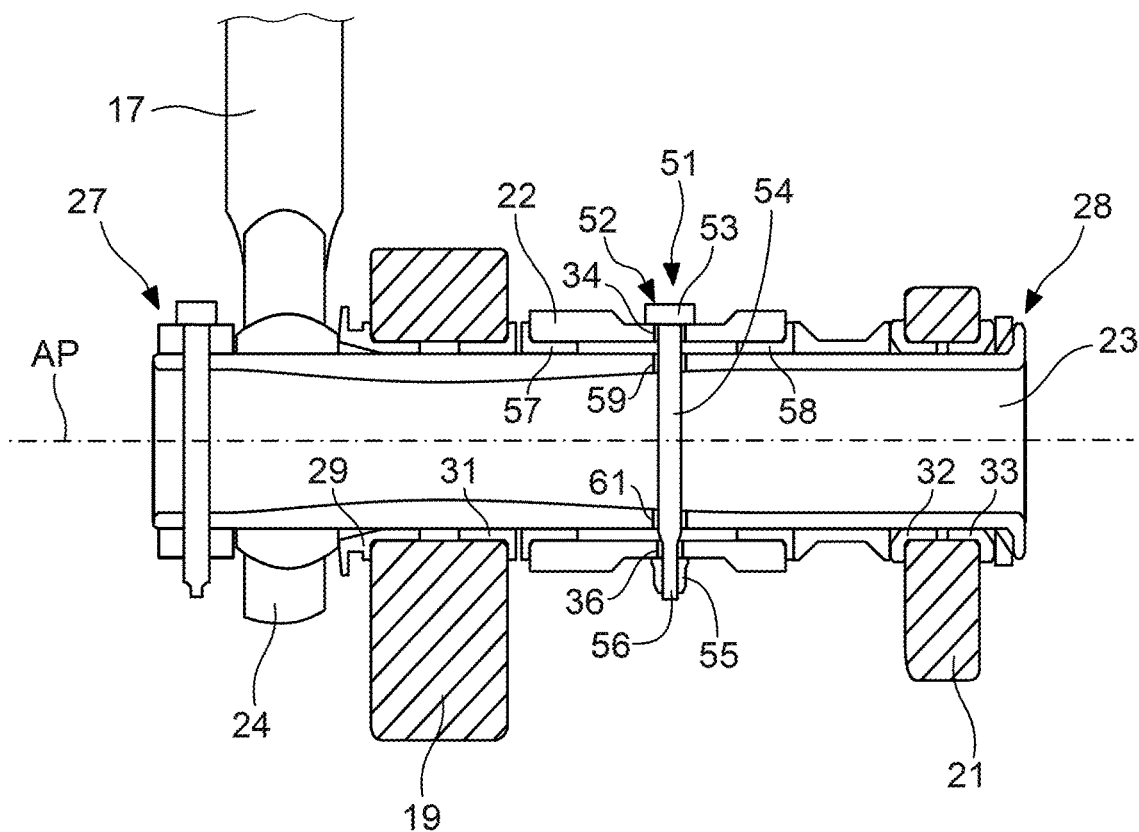
FIG. 7 is a cross-sectional view of the alternative of the invention applied to a landing gear.

In the example of the landing gear shown in the figures, and as visible in FIGS. 5 and 7, the lifting pin 23 is carried by the lugs 19 and 21 through which it passes, via two pairs of rings 29, 31, 32, 33. These two pairs of rings form bearings which enable this pin to pivot on itself, for example when the landing gear is operated from one state to another.

The head 22 is carried by the lifting pin 23 via another pair of rings 34, 36 forming bearings which redundantly enable the head 22 to rotate relative to the lifting pin 23 which carries it.

In the event of the lifting pin 23 breaking between its first end and the first lug, for example under the effect of the forces exerted in this region by the operating head 24 of its actuating jack, this lifting pin 23 is likely to move and get out of the clevis 18, in a direction of movement from the first clevis to the second. In practice, this migration of the pin is promoted by the vibrations of the whole during operation, and it may lead the pin to fully get out of its housing.

More particularly, in such a situation, the lifting pin 23 is no longer retained by the first stop 27, which allows its translation towards the second lug. In this case, the arm 11 is no longer held, so that interlocking in the deployed state of the landing gear is no longer ensured.

According to the invention, a locking system 37 is provided to lock its second end of the lifting pin 23 in both directions. More particularly, the second ring 33 is shrink-fit into the bore of the second lug 21 which receives it, to be rigidly integral with this lug, instead of being able to pivot in the bore which receives it. This second ring 33 includes two radial tabs 38 and 39 which extend in opposite directions and radially with respect to the axis AP, to protrude radially beyond the shoulder 30.

The shrink fit of the ring 33 may be achieved by means of an interference fit of the ring in the bore, with the ring being mounted by means of a press. Alternatively, the shrink-fit ring can be mounted by cooling the ring to retract it before installation in the bore, so that it can be deployed when reheated.

In addition, a locking bar 41 extends radially so as to be located facing the shoulder 30, that is, facing the second end of the pin 23, in order to form an obstacle to the axial movement of the latter. This bar 41 has a total length greater than the diameter of the shoulder 30 and corresponding to the distance separating the ends of the tabs 38 and 39. It includes a body 42 from which ends 43, 44 each fixed to one of the tabs 38 and 39, extend.

Figure 4:
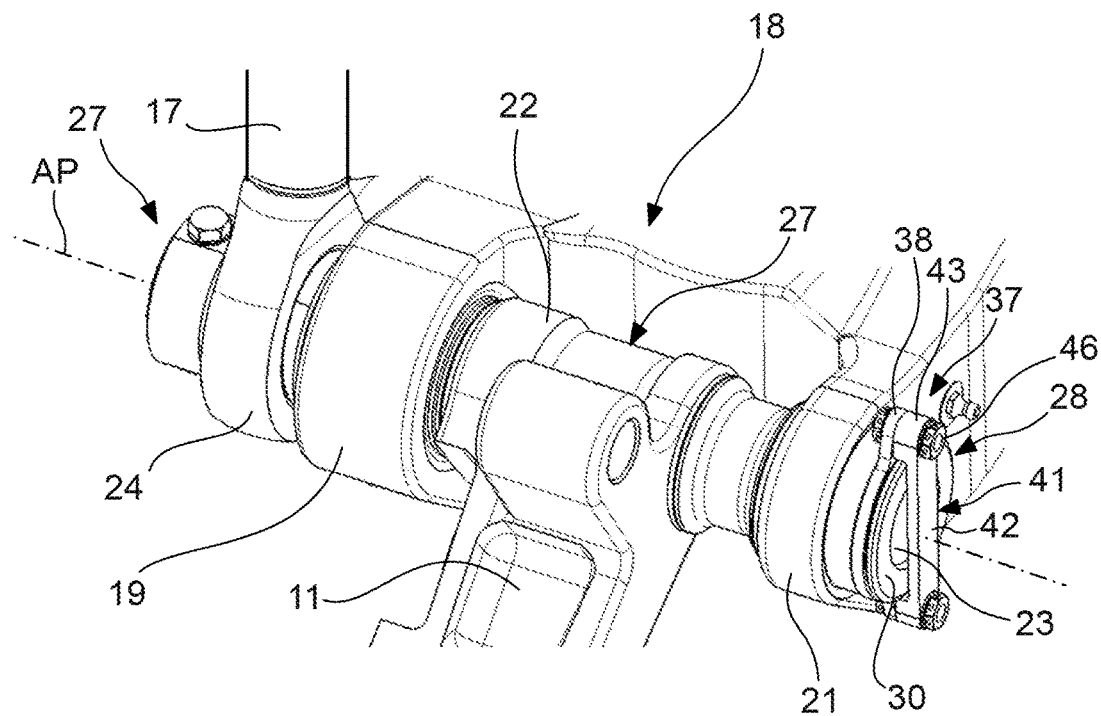
FIG. 4 is a perspective view of a connection by a lifting pin of a landing gear strut assembly with its operating jack and with a stay arm and fitted with a locking system according to the invention.

As visible in FIGS. 4 and 5, the ends 43 and 44 of the bar 41, which bear on the tabs 38 and 39 in the direction AP, are thicker than the body 42 of this bar in the direction AP, so that the body 42 does not bear on the second end of the lifting pin 23, that is, the shoulder 30, during normal operation of the landing gear.

Each end of the bar 41 is fixed to the corresponding tab of the second ring 33 by two bolts 46 and 47, extending in the direction AP, each passing through one end of the bar and one radial tab of the ring 33.

In the event of the lifting pin 23 breaking at its first end, the first stop 27 is no longer operational, but a movement of the lifting pin 23 is then locked by the bar 41 on which the shoulder 30 then bears. In this case, a movement of the lifting pin 23 in the opposite direction remains locked by the shoulder 30 bearing on the second ring 33, that is, on the second lug.

Alternatively, a bolt 51 can be provided which passes jointly through the head 22 and the lifting pin 23 so as to translationally keep this pin stationary even when either of its end stops 27, 28 can no longer ensure its translation locking.

Figure 6:
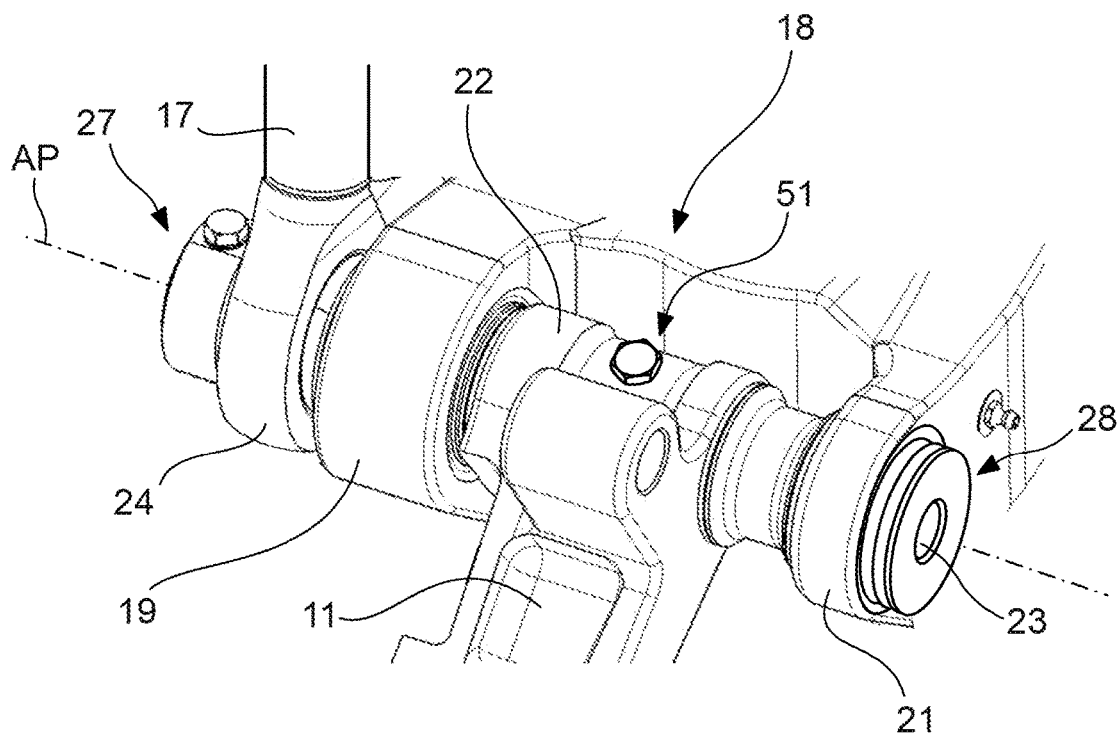
FIG. 6 is a perspective view of a connection by a lifting pin of a landing gear strut assembly with its operating jack and with a stay arm and fitted with a locking bolt according to an alternative of the invention.

As visible in FIG. 6, the bolt 51 extends radially with respect to the lifting pin 23 through which it passes. It includes a screw 52 having a head 53 bearing on the outer face of the head 22 of the arm 11, this head 53 from which a shank 54, the threaded end of which receives a nut 55, extends.

More particularly, the shank 54 successively passes through the wall of the head 22, the wall of the lifting pin 23 which is tubular here, then again the wall of the lifting pin 23, and again the wall of the head 22 in order to protrude from the opposite side of the head 22 where this shank 54 includes a threaded end 56 receiving the nut 55 which bears on the outer face of the head 22.

When the bolt 51 is in place and passes through the head 22 and the lifting pin 23, it prohibits rotation of the head 22 relative to the lifting pin 23, but this does not prevent deployment of the landing gear as it remains free to pivot relative to the lugs 19 and 21.

Installation of the bolt on an existing landing gear firstly consists in drilling right through the head 22 of the arm 11 so as to also pass through the lifting pin 23 carrying that head, which in practice forms two radial through holes 57 and 58 through that head 22 and two further radial through holes 59 and 61 aligned through the lifting pin 23. The shank 54 of the screw 52 is then engaged through these aligned holes to receive at its free threaded end 56 the nut 55 which is then appropriately tightened.

What is claimed is:

1. An aircraft landing gear comprising a strut assembly hinged to a structure element of the aircraft to pivot between a deployed state and a retracted state, the landing gear comprising:

a jack to retract and deploy the landing gear, the jack having an operating head connected to a first end of a lifting pin carried by two lugs of a clevis of the strut assembly, the first end being located outside the clevis;

an interlocking system comprising a stay including an arm hinged to an upper part of the strut assembly via the lifting pin, the arm being terminated by a head located between the lugs of the clevis and through which the lifting pin passes;

a first end stop carried by the lifting pin at the first end, and a second end stop located at the second end of the lifting pin; and a system for translationally locking the lifting pin in the event of the lifting pin breaking between the first end and the clevis.

2. The landing gear according to claim 1, wherein the second stop includes a shoulder formed at the second end of the lifting pin, and wherein the interlocking system includes a locking member located axially facing the shoulder.

3. The landing gear according to claim 2, wherein the locking member is rigidly attached to the clevis by being fixed to a ring carried by one of the two lugs, the ring forming a bearing of the lifting pin and being rigidly attached to the lug which carries the ring.

4. The landing gear according to claim 3, wherein the ring is rigidly attached to the bore of the lug by shrink fit.

5. The landing gear according to claim 4, wherein the locking member is a bar having a length greater than the diameter of the shoulder.

6. The landing gear according to claim 5, wherein the ring includes two tabs protruding radially beyond the shoulder, and two bolts each passing through one end of the bar and one radial tab.

7. The landing gear according to claim 1, wherein the locking system includes a radially extending screw passing jointly through the head of the arm and the lifting pin.

8. The landing gear according to claim 7, wherein the screw passes right through the head and the lifting pin and is held by a nut screwed on an end of the screw.

\* \* \* \* \*